United States Patent
Gil et al.

(10) Patent No.: US 7,852,819 B2
(45) Date of Patent: Dec. 14, 2010

(54) CLIENT OPERATION FOR NETWORK ACCESS

(75) Inventors: Thomer M. Gil, Brookline, MA (US);
Sanjit Biswas, San Francisco, CA (US);
John Bicket, San Francisco, CA (US)

(73) Assignee: Meraki, Inc., San Francisco, CA (US)

( * ) Notice: Subject to any disclaimer, the term of this patent is extended or adjusted under 35 U.S.C. 154(b) by 0 days.

(21) Appl. No.: 12/039,530

(22) Filed: Feb. 28, 2008

(65) Prior Publication Data

US 2008/0285483 A1   Nov. 20, 2008

Related U.S. Application Data

(60) Provisional application No. 60/892,432, filed on Mar. 1, 2007, provisional application No. 60/892,437, filed on Mar. 1, 2007, provisional application No. 60/892,440, filed on Mar. 1, 2007, provisional application No. 60/892,443, filed on Mar. 1, 2007, provisional application No. 60/892,449, filed on Mar. 1, 2007.

(51) Int. Cl.
*H04L 7/00* (2006.01)

(52) U.S. Cl. .................................. 370/338; 370/328

(58) Field of Classification Search ................ 370/328, 370/338
See application file for complete search history.

(56) References Cited

U.S. PATENT DOCUMENTS

| | | | |
|---|---|---|---|
| 6,704,301 B2 | 3/2004 | Chari et al. | |
| 6,868,080 B1 | 3/2005 | Umansky et al. | |
| 6,925,069 B2 | 8/2005 | Koos, Jr. et al. | |
| 7,016,328 B2 | 3/2006 | Chari et al. | |
| 7,444,158 B2 * | 10/2008 | Shitama et al. | 455/512 |
| 7,508,799 B2 * | 3/2009 | Sumner et al. | 370/338 |
| 7,630,341 B2 * | 12/2009 | Buddhikot et al. | 370/331 |
| 2001/0024953 A1 * | 9/2001 | Balogh | 455/432 |
| 2002/0006788 A1 * | 1/2002 | Knutsson et al. | 455/422 |
| 2003/0095520 A1 | 5/2003 | Aalbers et al. | |
| 2003/0142641 A1 * | 7/2003 | Sumner et al. | 370/328 |
| 2003/0169713 A1 | 9/2003 | Luo | |

(Continued)

FOREIGN PATENT DOCUMENTS

EP   1265397 A2   12/2002

(Continued)

OTHER PUBLICATIONS

Krag, Thomas, et al. "Wireless Mesh Networking", posted at Wireless DevCenter on Jan. 22, 2004, retrieved from the Internet at [http://www.oreillynet.com/lpt/a/4535] on Feb. 27, 2007, pp. 1-9.

(Continued)

*Primary Examiner*—Daniel J. Ryman
*Assistant Examiner*—Jay P Patel
(74) *Attorney, Agent, or Firm*—Townsend and Townsend and Crew LLP

(57) ABSTRACT

A network traffic device for a managed network can operate as a client host, to receive packets from the managed network and forward them to an uplinked external network, thereby operating as a gateway to the uplink network and performing a network address translation (NAT) function for the managed network relative to the uplinked network.

11 Claims, 5 Drawing Sheets

U.S. PATENT DOCUMENTS

| | | | |
|---|---|---|---|
| 2003/0179750 A1 | 9/2003 | Hasty et al. | |
| 2004/0141522 A1* | 7/2004 | Texerman et al. | 370/466 |
| 2004/0253970 A1* | 12/2004 | Kunihiro | 455/519 |
| 2004/0264395 A1 | 12/2004 | Rao | |
| 2005/0059396 A1* | 3/2005 | Chuah et al. | 455/435.1 |
| 2005/0229238 A1 | 10/2005 | Ollis et al. | |
| 2005/0259598 A1 | 11/2005 | Griffin et al. | |
| 2006/0009246 A1 | 1/2006 | Marinier et al. | |
| 2006/0014562 A1 | 1/2006 | Syrtsov et al. | |
| 2006/0053216 A1* | 3/2006 | Deokar et al. | 709/223 |
| 2006/0089964 A1 | 4/2006 | Pandey et al. | |
| 2006/0155833 A1* | 7/2006 | Matsuda et al. | 709/220 |
| 2006/0187873 A1 | 8/2006 | Friday et al. | |
| 2006/0209714 A1 | 9/2006 | Ackermann-Markes et al. | |
| 2007/0002833 A1 | 1/2007 | Bajic | |
| 2007/0064661 A1 | 3/2007 | Sood et al. | |
| 2007/0156813 A1 | 7/2007 | Galvez et al. | |
| 2007/0286393 A1 | 12/2007 | Roever et al. | |
| 2008/0095180 A1 | 4/2008 | Vucina et al. | |

FOREIGN PATENT DOCUMENTS

| | | |
|---|---|---|
| EP | 1473900 A2 | 11/2004 |
| WO | WO03/079709 A1 | 9/2003 |
| WO | WO2006/046261 A | 5/2006 |
| WO | WO2006/121465 A1 | 11/2006 |

OTHER PUBLICATIONS

Bicket, John, et al. "Architecture and Evaluation of an Unplanned 802.11b Mesh Network", *MobiCom'05*, Aug. 28-Sep. 2, 2005, Cologne, Germany, pp. 1-12.

"Changing Your MAC Address in Window XP/Vista, Linux and Mac OS X (Sometimes known as MAC spoofing)", retrieved from the Internet on Feb. 27, 2007 at [http://www.irongeek.com/i.php?page=security/changemac&mode=print], pp. 1-4.

"No Internet With New Router, Computer, or Adapter: MAC Spoofing", posted at Netgear, retrieved from the Internet on Feb. 27, 2007 at [http://kbserver.netgear.com/kb_web_files/n101227.asp], p. 1.

Griffiths, Rob "Set newer portable Macs' sleep mode", posted at Macworld: MAC OS X Hints, on Oct. 19, 2006, retrieved from the Internet on Feb. 27, 2007 at [http://www.macworld.com/weblogs/macosxhints/2006/10/sleepmode/index.php?pf=1].

"The Linksys BEFSR41 Etherfast Cable/DLS Router", posted at *Network Lab—A Guide to Networking An NTL Cable Modem*, retrieved from the Internet on Feb. 27, 2007 at [http://www.networklab.co.uk/cmodem/linksys.html].

Buddhikot, M.M., et al. "Integration of Wireless LAN and 3G Wireless—Design and Implementation of a WLAN/CDMA2000 Interworking Architecture", *IEEE Communications Magazine* (Nov. 2003) vol. 41(11):99-100.

Caltech and Partners: "Application Monitoring API" [Online] Dec. 23, 2005, pp. 1-2, retrieved from the Internet at URL:http//monalisa.cacr.caltech.edu/monalisa_Service_ Applications_ApMon.html> on Jul. 29, 2008.

Comer, D. *Internetworking with TCP/IP* (1995), Prentice Hall, USA, pp. 61-62, paragraph 4.5.

Congdon, P.(Hewlet Packard Company), et al. "IEEE 802.1X Remote Authentication Dial in User Service (RADIUS) Usage Guidelines", *IEFT Standard, Internet Engineering Task Force* (Sep. 2003) pp. 1-30.

Konstantinou, A., NetCallback 1.3.1 Forwarding TCP and UDP ports behind a firewall [Online] 2001, pp. 1-5, retrieved from the Internet at URL:http://netcallback.sourceforge.net/> on Jul. 29, 2008.

Roch, Stephane "Nortel's Wireless Mesh Network solution: Pushing the boundaries of traditional WLAN technology", *Nortel Technical Journal* (Jul. 2005) Issue 2, pp. 18-23.

Wang, et al. "Global Connectivity for Mobile IPv6-based Ad Hoc Networks", *Proceedings of the 19th International Conference on Advanced Information Networking and Applications (AINA'05)* (Mar. 2005), vol. 2:807-812.

RFC 2131, Dynamic Host Configuration Protocol, Mar. 1997, retrieved from the internet <tools.iett.org/pdf/rfc2131.pdf>, pp. 1-46.

* cited by examiner

FIG. 3

CLIENT OPERATION FOR NETWORK ACCESS

CROSS-REFERENCES TO RELATED APPLICATIONS

This application claims the benefit of U.S. Provisional Application Ser. No. 60/892,440 entitled "Client Operation For Network Access" by Thomer M. Gil, et al., filed Mar. 1, 2007, and the benefit of the following co-pending U.S. Provisional Applications: entitled "System and Method For Hosted Network Management", by S. Biswas, et al., Ser. No. 60/892,432, filed Mar. 1, 2007; entitled "Node Self-Configuration and Operation in a Wireless Network", by S. Biswas, et al., Ser. No. 60/892,437; entitled "System and Method for Remote Monitoring and Control of Network Devices" by S. Biswas et al., Ser. No. 60/892,443, filed Mar. 1, 2007; entitled "Client Addressing and Roaming in a Wireless Network" by Thomer M. Gil et al., Ser. No. 60/892,449, filed Mar. 1, 2007. Priority of the filing dates is hereby claimed, and the disclosures of the Provisional Applications are hereby incorporated by reference.

BACKGROUND

Wireless computer networks comprise mesh networks that include at least one node connecting the mesh network to a wide area network (WAN) through a backhaul connection. The WAN can comprise, for example, the Internet, and the backhaul connection node is referred to as a gateway. The backhaul connection node typically comprises a cable interface (cable modem) or DSL interface or the like, comprising a wired broadband connection. Other nodes of the wireless network typically comprise wireless access points that communicate with the backhaul connection. Devices that can operate as wireless access points include wireless routers, wireless bridges, so-called repeaters or range extenders, and the like. A wireless network typically includes a single wired backhaul connection and multiple wireless access points. Client devices may gain access to the WAN (Internet) through wireless communications with one of the access points or through a wired connection with the backhaul connection. The client devices can comprise a wide variety of devices, such as laptop computers, PDAs, and other handheld devices.

Deployment of wireless networks is hindered by the requirement for the wired backhaul connection node. The wired backhaul connection fixes a single geographic location as a limiting point of the wireless network. Repeaters can extend the geographic reach of the wireless network, but all network traffic must ultimately move through the backhaul connection. This limits the capacity and bandwidth of the wireless network. Greater deployment of wireless network, and easier operation, would be possible if greater flexibility was possible in connection with obtaining network connections to the WAN.

One network can be joined to another network by means of a bridge. The bridge receives packets over the first network and forwards the packets in accordance with destination address information of the packets. To properly forward messages, a bridge constructs a routing table of network addresses. Bridges are of relatively simple construction and can be an economical way to expand the coverage of a network. It is possible to configure a wireless access point in a wireless network to act as a bridge, according to a wireless bridging protocol such as Wireless Distribution Service (WDS). If two wireless access points (routers) are configured to support WDS, one of them can act as a client router and the other acts as a host router. The client router has no Internet connection of its own, whereas the host router has an Internet connection and shares it with the client router. A WDS-enabled access point wireless bridge must be specially configured for using WDS, which requires specialized support. The WDS also consumes some of the wireless bandwidth for overhead.

From the discussion above, it should be apparent that there is a need for wireless access points that can be more easily and economically used in connection with more than one network. The present invention satisfies this need.

SUMMARY

Described herein is a network traffic device for a managed network in which the network traffic device receives an uplink identifier (ID) that identifies a wireless network for uplink communication using a network communication protocol, performs a scan of wireless networks and produces identical first and second lists of access points identified by the scan and wireless networks with which the identified access points are associated. The network traffic device then deletes access points from the first list that are not suitable for use as an uplink for the managed network and deletes access points from the second list that are not members of the managed network, and associates with an identified access point that remains in the first list and operates as a gateway to neighboring access points for the uplink wireless network of the uplink ID, or joins an existing wireless network identified in the second list by the performed scan if no identified access point remains in the first list, and otherwise operates as a gateway and permits client devices to associate for a predetermined time and then repeats performing the scan of wireless networks. In this way, the network traffic device easily operates as a bridge between two wireless networks, without the overhead of protocols such as WDS, and can operates as an uplink from the managed network to independent external networks.

Other features and advantages of the present invention should be apparent from the following description of the preferred embodiments, which illustrate, by way of example, the principles of the invention.

BRIEF DESCRIPTION OF THE DRAWINGS

FIG. 3 is a screenshot of a configuration page of the managed network showing how a traffic device can be configured as an uplink for a managed network in the FIG. 1 system.

DETAILED DESCRIPTION

The present invention provides a network traffic device for a managed network in which the network traffic device receives an uplink identifier (ID) that identifies a wireless network for uplink communication using a network communication protocol, performs a scan of wireless networks and produces identical first and second lists of access points identified by the scan and wireless networks with which the identified access points are associated. The network traffic device then deletes access points from the first list that are not suitable for use as an uplink for the managed network and deletes access points from the second list that are not members of the managed network, and associates with an identified access point that remains in the first list and operates as a gateway to neighboring access points for the uplink wireless network of the uplink ID, or joins an existing wireless network identified in the second list by the performed scan if no identified access point remains in the first list, and otherwise operates as an access point and permits client devices to associate for a predetermined time and then repeats performing the scan of wireless networks.

Thus, the network traffic device constructed in accordance with the invention can operate as a client host, to receive packets from the managed network and forward them to an uplinked external network, thereby operating as a gateway to the uplink network and perform a network address translation (NAT) function for the managed network relative to the uplinked network.

Network Configuration

Figure 1:
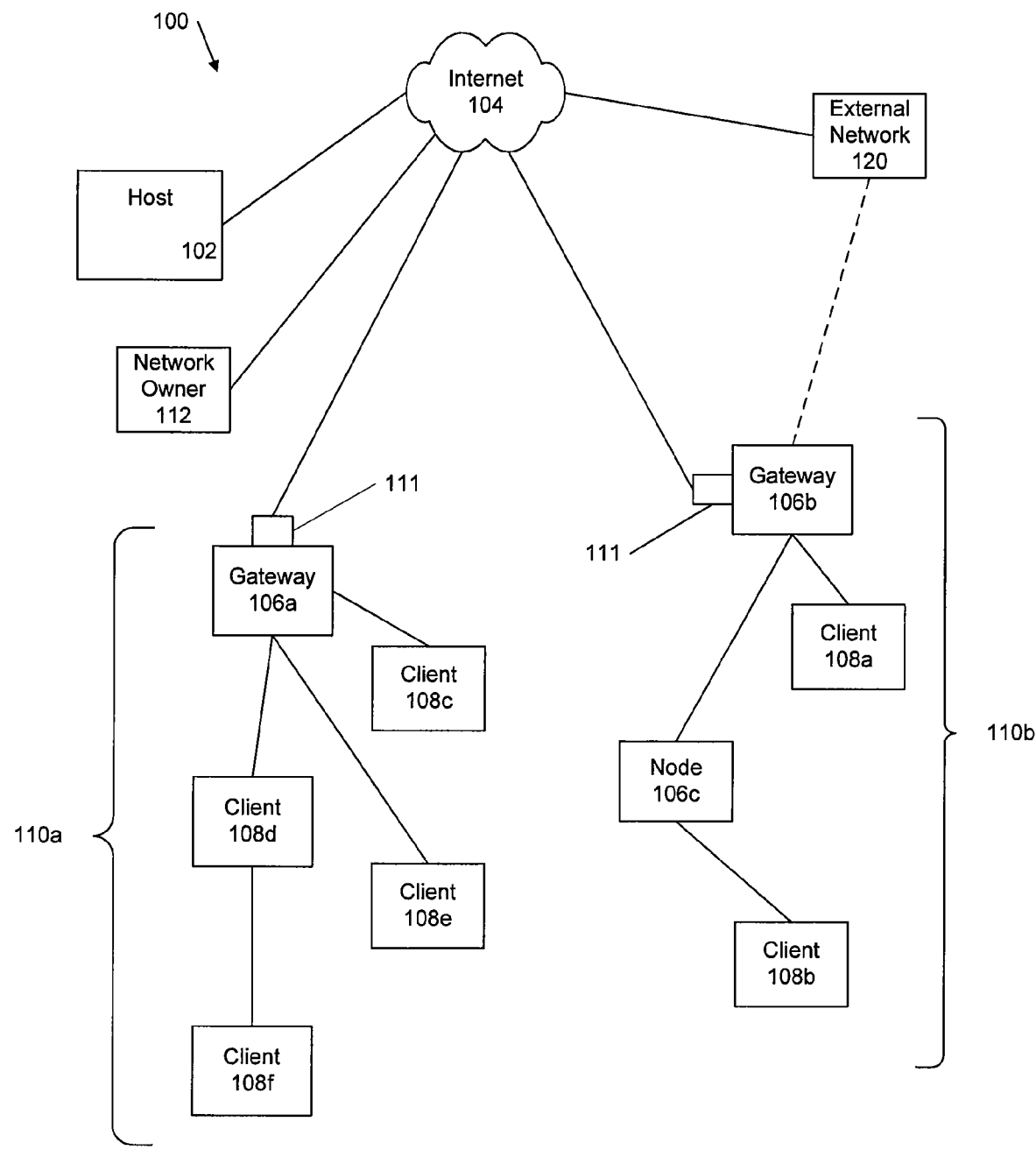
FIG. 1 is a block diagram representation of a hosted network 100 constructed in accordance with the invention.

FIG. 1 is a block diagram representation of a hosted network 100 constructed in accordance with the invention. The hosted network 100 includes a host 102 that communicates over a network infrastructure 104, such as the Internet, with multiple communication devices 106, 108. The communication devices include network traffic devices 106, such as access points or routers, and client devices 108, such as laptop computers, desktop computers, and portable computing devices, all of which are capable of communicating with each other using a network communications protocol specification. In FIG. 1, particular communication devices 106, 108 are designated with a letter suffix ("a", "b", etc.). Particular devices will be referenced by their respective suffix 106a, 106b, 106c and 108a, 108b, . . . , 108f. References to the devices 106, 108 without their particular suffix will be understood to be a reference to the group collectively.

All of the devices 106, 108 are capable of communicating with each other over a wireless network communications protocol specification, such as the 802.11x family specification of the IEEE, also referred to as "wireless broadband" or "WiFi". The devices 106, 108 define a managed network 110 whose member devices communicate with the host computer 102, also referred to as the backend server. The managed network 110 includes component local mesh networks that are identified with a letter suffix ("a" or "b") so that references to the local networks without their suffix are references to the local networks collectively as the managed network. When it is necessary to refer to a particular local network 110a, 110b, the suffix identifier will be used.

The traffic devices 106 in FIG. 1 that are designated as gateways 106a, 106c serve as an interface between the WAN (Internet) 104 and their respective local wireless mesh networks. FIG. 1 shows each gateway as having an interface device 111 interposed between itself and the Internet. That is, the interface device is upstream of the gateway. Those skilled in the art will understand details of such devices, which may comprise cable modems, DSL interfaces, and the like. Alternatively, the interface may be incorporated into the gateway device rather than being a separate component. Each gateway provides an interface between its respective mesh network and the Internet. For example, the gateway 106a is the Internet interface for the mesh network 110a comprising 106a and client 108c, client 108d, client 108e, and client 108f. The gateway 106b is the Internet interface for the mesh network 110b comprising gateway 106b, node 106c, client 108a, and client 108b. The gateways 106a, 106b communicate with the host 102 of the managed network and perform network address translation (NAT) functions for the devices 106, 108 within their respective managed networks 110a, 110b.

The mesh network 110 is operated under the control of a network owner 112, who can access management tools through a network portal interface of the host 102. Therefore, the network owner 112 is illustrated in FIG. 1 as being connected to the Internet 104, whereby the network owner using a computer or similar device can access a Web portal at the host 102 via a conventional Web browser. For the discussion herein, a reference to a "managed network" will be understood to be a reference to a local network having network traffic devices that operate according to the description and drawings herein under management of a network owner 112 through a service portal of the host 102.

The gateway devices 106a, 106b are also capable of network communications via a wired connection, such as Ethernet. The clients 108 can also have this dual capability. Thus, the managed networks 110a, 110b can include devices that are capable of communicating over both wired connections and wireless connections. In this discussion, the traffic devices 106 will also be referred to as routers or nodes of the managed networks. Thus, nodes as used herein comprise devices that can communicate over the managed networks 110 and can send data messages from other nodes toward destinations outside of the managed network, such as over the Internet 104 toward the host 102.

FIG. 1 shows that the network traffic devices (nodes) 106 can be provided with the ability to communicate with external networks that are outside of any of the managed networks 110. Thus, a dotted line represents a connection from the second gateway 106b to an external network 120. The external connection between the two 106b, 120 can comprise a wired connection or a wireless connection.

In FIG. 1, the network traffic device corresponding to the gateway 106b is shown with a connection to an external network 120 through which the gateway 106b can forward packets received from the clients 108a, 108b of its mesh network 110b to the uplinked external network 120. Therefore, the gateway 106b is acting as a bridge from the managed network 110b to the uplink external network 120 and performs a network address translation (NAT) function for the managed network relative to the uplinked network. The connection from the managed network gateway 106b to the external network 120 can be either a wireless connection or a wired (Ethernet) connection. Any one of the traffic devices 106 constructed in accordance with the invention can perform the uplink function, as described more fully below, including the gateway devices 106a, 106b and the node 106c. That is, all of the traffic devices 106a, 106b, 106c have a similar construction and therefore have similar operational capabilities.

Figure 2A:
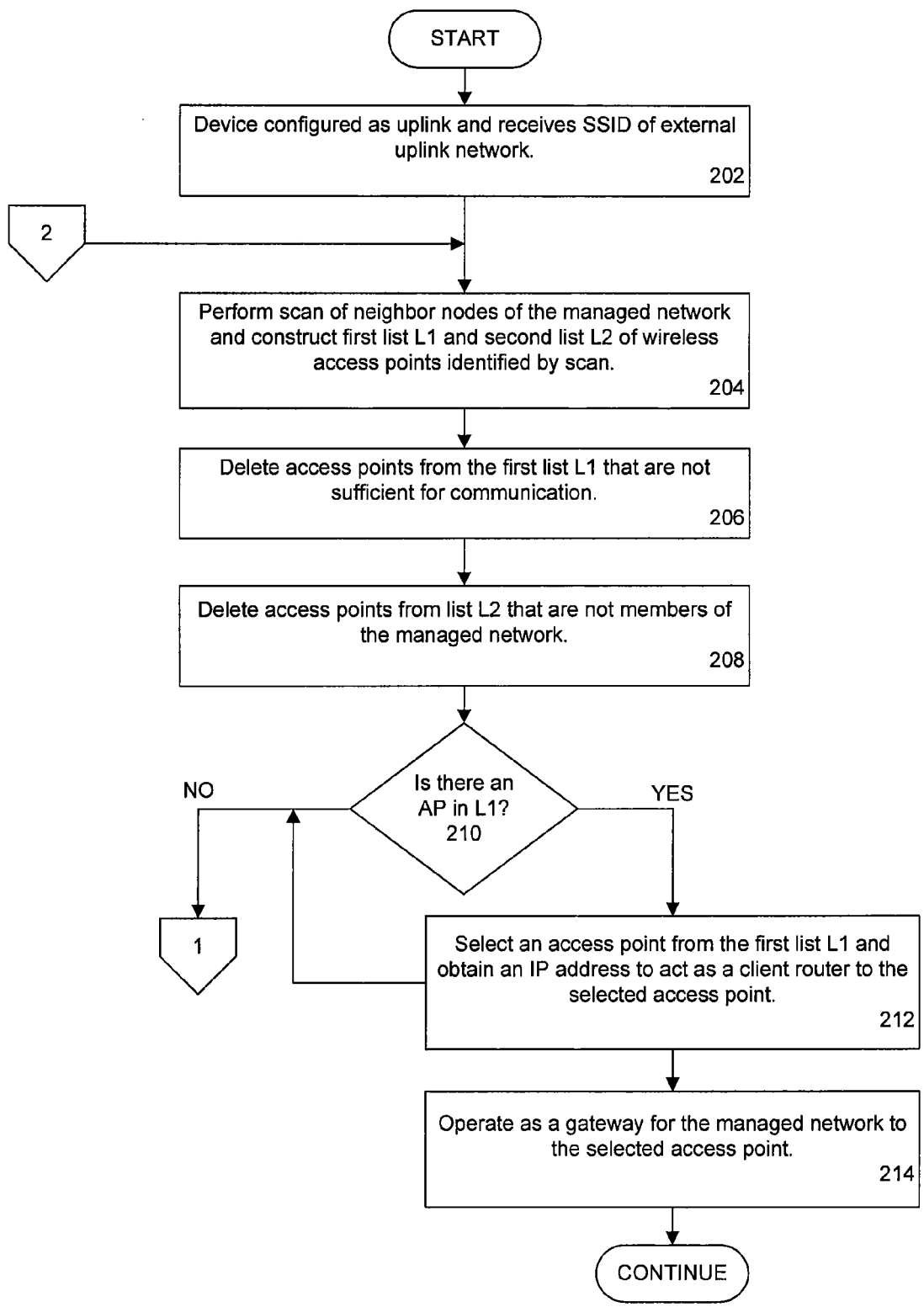
FIG. 2A and FIG. 2B are flowcharts that illustrate network address processing of the FIG. 1 system.
Figure 2B:
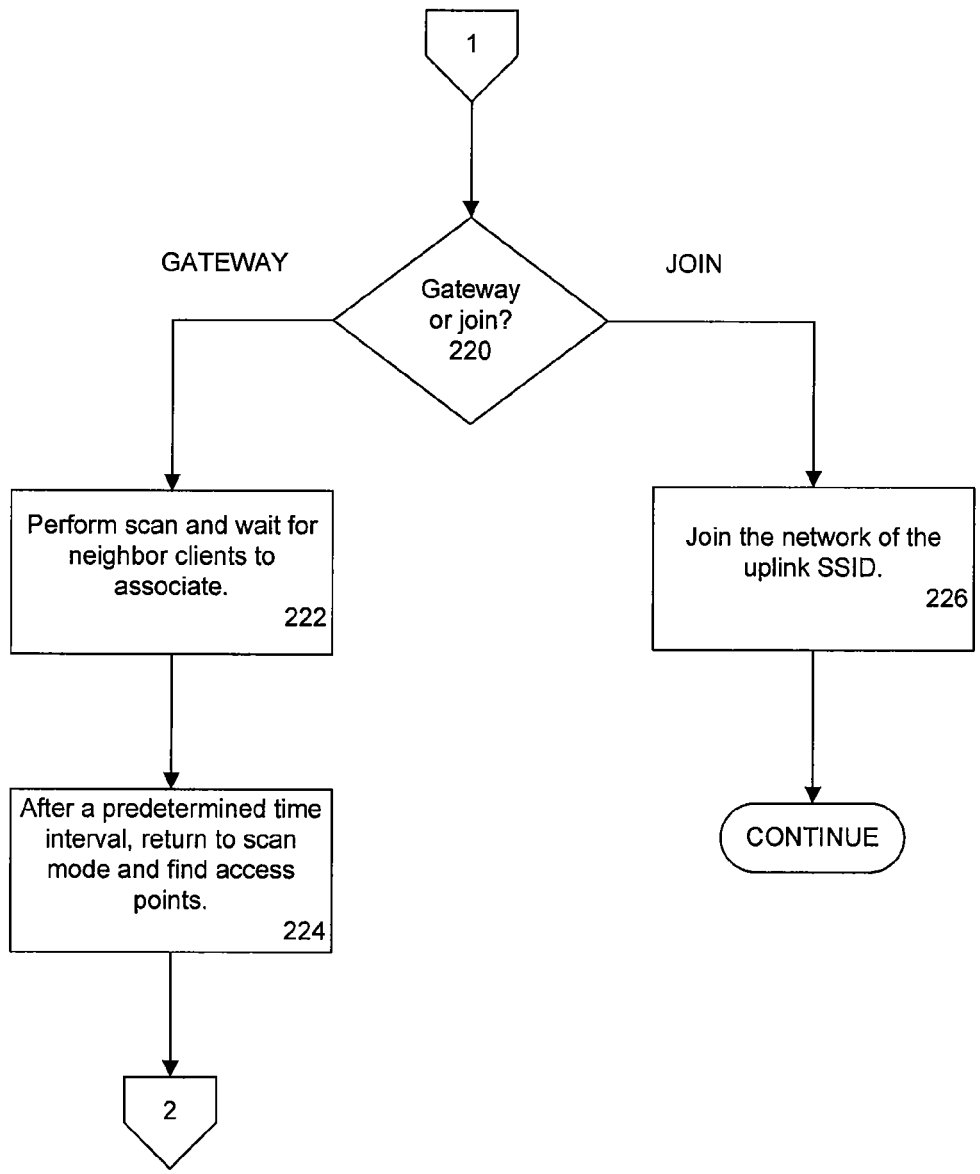

FIG. 2A and FIG. 2B are flowcharts that illustrate operation of the network traffic devices 106 of FIG. 1. The traffic devices 106 can provide network access to the clients 108 of their associated mesh networks 110 either because at least one of them is physically plugged into an upstream network via cable or because at least one of them connects wirelessly to another nearby wireless network as an interface on which it forwards network traffic. For example, in FIG. 1, the first traffic device 106a is physically plugged into an upstream network through the interface device 111 via an Ethernet cable, the traffic device 106b is plugged into another wired interface device or uses the external network 120 for Internet access, and the traffic device 106c utilizes the network connection of its neighbor gateway 106b to act as a wireless access point for client devices. Regardless of whether the traffic device connection is a direct connection to a network (106a) or is through a neighbor traffic device (such as the 106b-to-external 120 connection), any traffic device operating as a gateway (106a, 106b) advertises itself to other traffic devices (such as 106c) through broadcast messages to indicate that it can forward network traffic onto the Internet.

For example, a user may have a managed network within a space, such as a business or home, but not have DSL service or a cable modem that would provide Internet connectivity. If at least one end of the space is within the reach of another wireless network (e.g., the external network 120 of a neighbor) that is connected to the Internet, then Internet access may be gained through the neighbor network after appropriate access provisions are settled. In the case of using the neighbor network, the user may configure the managed network to use the neighbor network as an uplink to the Internet. Any traffic device 106 that is, or are, sufficiently close to the neighbor network can act as an uplink gateway for the user's managed network. Thus, the uplinked traffic device operates as if it were plugged into a cable modem or DSL modem and thereby routes traffic from the managed network onto the neighbor wireless network. It is not required that the uplinked neighbor network is a managed network in accordance with the invention.

Network Operation

In the first operation, illustrated by box 202 of FIG. 2A, a network owner 112 (see FIG. 1) can configure a traffic device 106 to use another wireless network as an uplink and specifies the SSID of an upstream wireless network and associated network information, such as security parameters, network name, and the like. In this discussion, the SSID of the upstream wireless network will be referred to as the "uplink SSID". When a traffic device receives a new configuration as a gateway, or whenever it reboots, it goes through a bootup decision process that begins with box 204.

At box 204, the traffic device operates in a scan mode in which it scans for wireless networks and produces two identical lists of the wireless access points it locates and the corresponding wireless network SSID information they advertise. The two lists will be referred to as list L1 and list L2. Next, at box 206, the traffic device deletes from list L1 all wireless access points that are not sufficient for communication as an uplink. In particular, the traffic device will delete all access points that do not advertise the configured uplink SSID, and will delete all access points that have a received signal strength indication (RSSI) less than 8 dB above the noise floor. The RSSI requirement ensures that access points with a poor connection to the traffic device will be ignored. At box 208, the traffic device deletes from list L2 all wireless access points that have a MAC address that indicates they are not members of a network being managed in accordance with the invention. After this operation 208, list L2 will be a list of neighbor traffic devices that have compatible operation with the traffic device to be operated as an uplink.

In the managed system 100, all traffic devices are self-configured such that they are assigned network addresses based on their MAC address. Thus, all traffic devices that operate in accordance with the invention to provide a managed network will have the ability to determine the network address that should be assigned to a compatible neighbor traffic device. In this way, a traffic device will readily know if a neighbor router is a compatible device simply by examining its network address and its MAC address. The self-configuration processing is described in greater detail in the application entitled "Node Self-Configuration in a Wireless Network" by S. Biswas et al. filed on the same date as the present application.

At the decision box 210, the traffic device checks to see if there is at least one wireless access point in the list L1. If there is at least one entry, an affirmative outcome at box 210, then at box 212 the traffic device will select the access point in L1 with the highest RSSI value (i.e., select the AP with the best connection to the traffic device) and will obtain an IP address from the access point. This operation will involve associating with the selected access point and providing a DHCP request to obtain an IP address. Upon receiving an IP address, at box 214, the traffic device will switch from the scan mode of operation to a gateway mode of operation in which the traffic device behaves as if the device were physically plugged into a network by Ethernet or the like at the uplinked network. In accordance with gateway operation, the traffic device will "advertise" itself as a gateway for any other nearby traffic devices. The uplinked traffic device now serves as a NAT device (gateway) to route packets from the managed network to the uplinked wireless network. The traffic device continues operation in this fashion, unless the traffic device fails to receive an IP address from a DHCP reply message. If the device fails to receive an IP address at box 212, or if at the decision box 210 there are no access points in the list L1, the processing proceeds to box 220 of FIG. 2B.

At box 220, the traffic device checks to see if it was configured as a "gateway only" device. If its configuration is set to "gateway only", then at box 222 the traffic device will perform a "scan wait" mode of operation. In scan wait mode, the traffic device will allow clients in the area of the managed network to associate. That is, clients will be able to login to the managed network through the traffic device. Because the "gateway only" traffic device is configured to operate as an uplink (box 202) but has not yet received an IP address (box 212) or has not yet located a suitable access point (box 210), users will see a managed network host display (i.e., a Web site, such as on http://my.meraki.net/) indicating that the wireless uplink is unavailable. After a predetermined time, such as three minutes, the traffic device will switch to the scan mode if no client devices have logged in. This return to scan mode is indicated at box 224 with a return to box 204 of FIG. 2A. Clients can log in to the router to check the status via a Web page until the traffic device starts scanning again, at which point clients will be logged off the router and it will scan. At box 220, if the traffic device is not configured to be a gateway, then at box 226 the traffic device attempts to join a managed network. The traffic device checks the list L2 to determine the communications channel being used by nearby traffic devices of a managed network, and joins the corresponding managed network identified in its list L2.

A variety of hardware configurations can be used for the devices described above. For example, conventional server and desktop computers can be used for the server host 102. In the illustrated embodiment, the server operates the Linux operating system. Other details of construction and operation will occur to those skilled in the art in view of the description herein. The nodes 106 can comprise routers, wireless access points, and suitably configured computer devices that might otherwise comprise clients 108 in the managed network. In the illustrated embodiment, the host 102 and traffic devices process network traffic and operate with the Linux operating system. It should be understood that other operating systems may be used, so long as the devices can provide the functionality and operations described herein. Although the network communications have been described above in accordance with the Internet protocol (IP), it should be understood that a wide variety of network communication protocols can be accommodated in accordance with the invention. The operations described herein for the gateways routers 106 and client devices 108 can be performed by device firmware or by application software installed on the respective devices. All of the devices capable of network communications will include any necessary network interface components, as will be known to those skilled in the art.

A variety of management tools are provided to the network owner 112 (FIG. 1). As noted above, one of the management tools is a configuration tool with which the network owner can specify that a traffic device will operate as a gateway or an uplink to another network. In the illustrated embodiment of FIG. 1, the management tool is provided by means of a Web portal at the host 102 that can be accessed by the network owner 102 via an Internet connection and a conventional browser.

Figure 3:
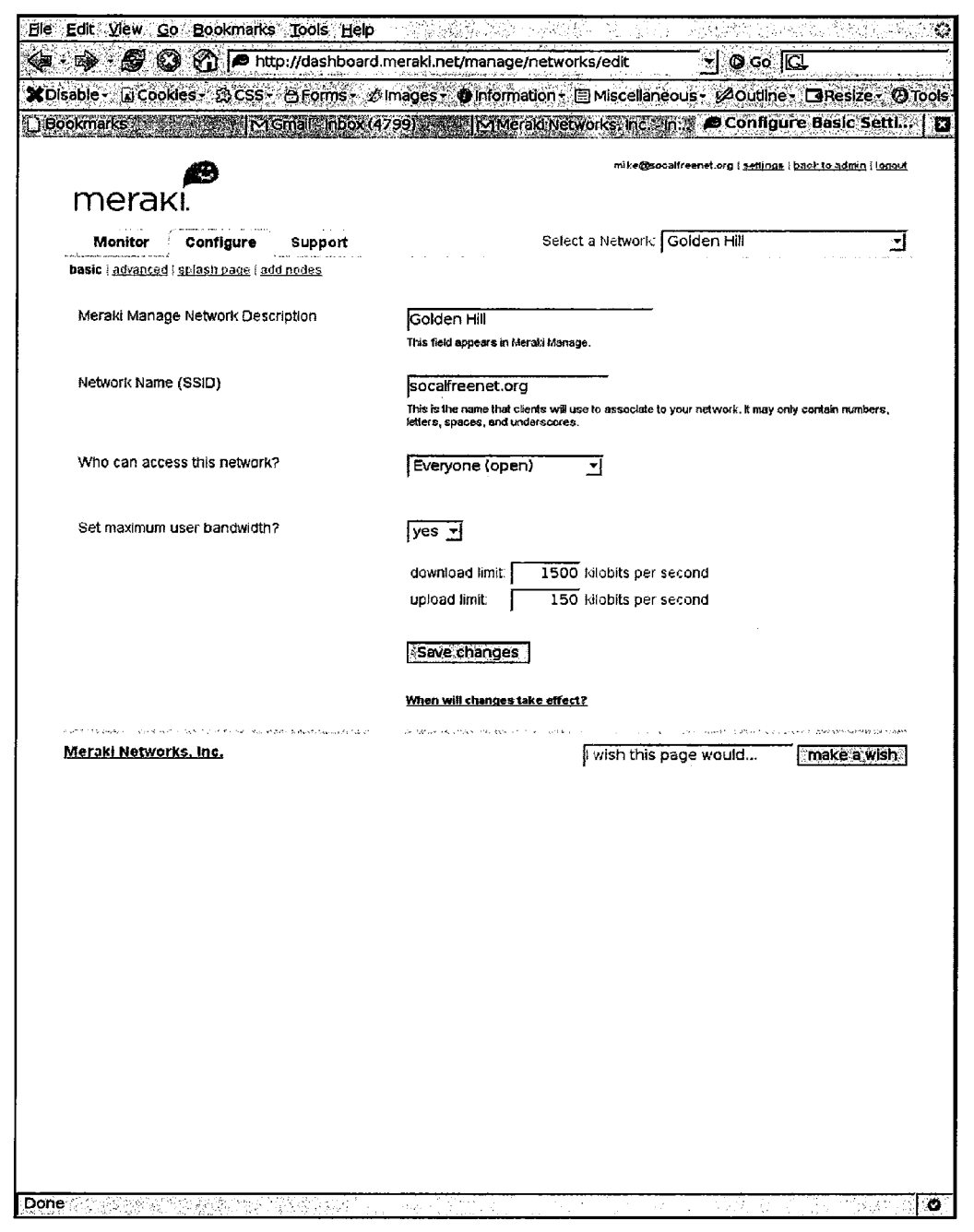

FIG. 3 is a screenshot representation of a management tool comprising a configuration page produced by the host 102. The network owner can use the configuration page after a login process with a Web portal of the host, using a conventional Web browser. The configuration page permits the network owner to enter configuration information and settings for the mesh network 110 that will be controlled and managed by the network owner. The FIG. 3 screenshot shows that various display pages can be selected via tabs corresponding to configure, access control, splash page, alerts, and any blocked user (client) devices. The configuration page enables the network owner to provide information the network name by which the network owner is known to the host, along with the network SSID information. The channel operation can also be provided. Any desired network passwords for client devices may be specified through access control inputs, if the managed network will not be operated as an open network but rather as a closed network. In the case of a closed network, each node will operate so as to block client devices from using the managed network unless appropriate login information is received that matches the access control information entered by the network owner through the configuration page of FIG. 3.

A variety of hardware configurations can be used for the devices described above. For example, conventional server and desktop computers can be used for the server host 102. In the illustrated embodiment, the server operates the Linux operating system. Other details of construction and operation will occur to those skilled in the art in view of the description herein. The nodes 106 can comprise routers, wireless access points, and suitably configured computer devices that might otherwise comprise clients 108 in the managed network. In the illustrated embodiment described herein, the nodes that process network traffic are specified as operating with the Linux operating system. Those skilled in the art will appreciate that a wide variety of device operating systems other than Linux can provide a suitable environment for execution of the operations described herein. Thus, any computer device that can perform the operations described herein can be utilized in a managed network system constructed in accordance with the invention.

Figure 4:
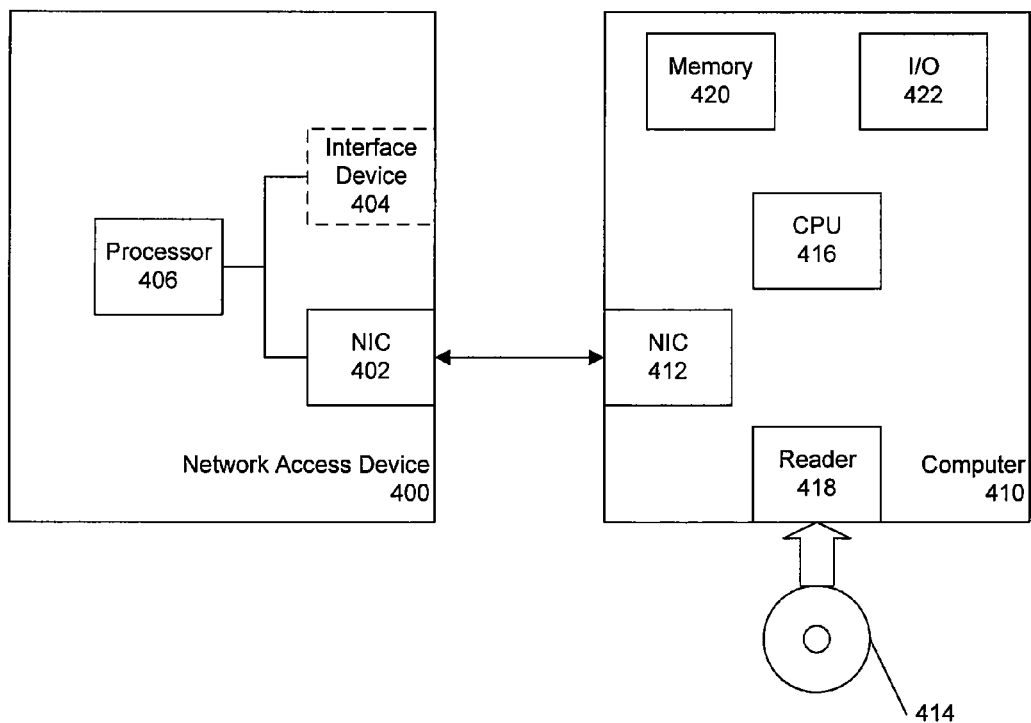
FIG. 4 is a block diagram that shows network devices constructed in accordance with the present invention.

FIG. 4 shows configurations for a network access device constructed in accordance with the present invention. A network access device for the managed network can comprise, for example, a wireless router or other access point for the managed network, or can comprise a personal computer or server device that operates as an access point. As noted above, such network access devices can operate as one of the gateway devices 106a, 106b, 106c illustrated in FIG. 1.

Two devices are illustrated in FIG. 4 that are capable of operation as gateways 106. One such device 400 in FIG. 4 comprises a wireless access point and includes a network communication interface 402 that permits communications with a network. The network interface can comprise a network interface card (NIC). The FIG. 4 device 400 includes an optional interface device 404 comprising a cable modem or DSL interface or the like. The interface device 404 is illustrated in dashed line to indicate that such capability is an optional component of the network access device 400, and to show that the interface device can be provided external to the network access device. The processor 406 of the device 400 comprises a computer processor chip and associated circuitry and related components, such as program memory, data memory, central processor unit, and the like. The processor 406 enables the device 400 to operate in accordance with the description herein via execution of appropriate program instructions.

The second device 410 illustrated in FIG. 4 that can operate as a gateway comprises a computer system such as a personal computer or server computer or the like. The computer 410 includes a network communication interface 412 that permits communications with a network. The network interface can comprise a network interface card (NIC).

The processor 406 of the access point 400 can receive program instructions for proper operation into the program memory of the processor. The program instructions can be received directly, such as by flashing EEPROM of the processor, or can be received through the network interface 402, such as by download from a connected device or over a WAN or LAN network communication. In the case of receiving program instructions through the network interface, the device 400 can be connected to the computer 410 that includes the program instructions in a suitable data file. If desired, the program instructions can be stored on a computer program product 414 that is read by the computer 410 so that the program instructions can thereafter be transferred to the device 400. That is, the program product 414 is for use in a computer system such as the computer 410, wherein the program product comprises a recordable media containing a program of computer-readable instructions that are executable by the device processor 404 to perform the operations described herein. The program instructions of the program product 414 can be transferred by the computer 410 to the device 400, whereupon the instructions can be executed by the device so as to operate in accordance with the methods and operations described herein. The program product 414 can comprise, for example, optical program media such as CD or DVD data discs, or flash memory drives, or external memory stores, or floppy magnetic disks, and the like. The computer 410 includes a central processor 416 and a program product reader 418 for receiving the program product media and reading the program instructions. The computer also includes associated memory 420 and input/output facilities 422, such as a display and keyboard.

Although the network communications have been described above in accordance with the Internet protocol (IP), it should be understood that a wide variety of network communication protocols can be accommodated in accordance with the invention. The operations described herein for the gateways routers 106 and client devices 108 can be performed by device firmware or by application software installed on the respective devices. All of the devices capable of network communications will include any necessary network interface components, as will be known to those skilled in the art. The programming such as firmware and application software for the operations described herein can be installed through conventional manufacturing and production processes and through typical program installation techniques for computer devices. For example, the programming can be installed from program media containing machine instructions that can be read from media such as CD or DVD optical disc devices such that when the instructions are executed by the computer device they will cause operation in accordance with the techniques described herein. Other sources of such programming include external program sources such as memory chips, floppy disks, thumb drives, flash memory, and the like that are received into reader devices such that the program instructions can be installed.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

We claim:

1. A method of operating a network traffic device for communication using a network communication protocol over a managed network, the method comprising:
   receiving an uplink identifier (ID) that identifies a wireless network for uplink communication using the network communication protocol;
   performing a scan of wireless networks and producing identical first and second lists of access points identified by the scan and wireless networks with which the identified access points are associated;
   deleting access points from the first list that are not suitable for use as an uplink for the managed network;
   deleting access points from the second list that are not members of the managed network;
   associating with an identified access point that remains in the first list and operating as a gateway to neighboring access points for the uplink wireless network of the uplink ID;
   joining an existing wireless network identified in the second list by the performed scan if no identified access point remains in the first list, and otherwise operate as a gateway and permit client devices to associate for a predetermined time and then repeat performing the scan of wireless networks;
   wherein associating with an identified access point that remains in the first list comprises:
   selecting the access point in the first list with the greatest received signal strength indication (RSSI) value;
   sending a DHCP request message to the selected access point and associating with the selected access point with operation as a gateway;
   broadcasting availability to neighbor client devices as a gateway to the wireless network with the received uplink ID if associating with the selected access point was successful.

2. The method as defined in claim 1, wherein deleting access points from the first list comprises:
   deleting access points from the first list that are not identified with the received uplink ID;
   deleting access points from the first list that are determined to have a substandard signal quality.

3. The method as defined in claim 2, wherein an access point is determined to have a substandard signal quality if the access point has a received signal strength indicator (RSSI) that is less than about 8 dB above a noise floor value for the managed network.

4. The method as defined in claim 1, wherein operating as a gateway comprises:
   receiving packets of the network communication protocol over the managed network; and
   routing the packets to the wireless network with the received uplink ID.

5. A method of operating a device for communication using a network communication protocol over a managed network, the method comprising:
   receiving an uplink identifier (ID) that identifies a wireless network for uplink communication using the network communication protocol;
   performing a scan of wireless networks and producing identical first and second lists of access points identified by the scan and wireless networks with which the identified access points are associated;
   deleting access points from the first list that are not identified with the received uplink ID;
   deleting access points from the first list that are determined to have a substandard signal quality;
   deleting access points from the second list that are not members of the managed network;
   if at least one access point remains in the first list, then:
      selecting the access point in the first list with the greatest received signal strength indication (RSSI) value;
      sending a DHCP request message to the selected access point and associating with the selected access point with operation as a gateway;
      broadcasting availability to neighbor client devices as a gateway to the wireless network with the received uplink ID if associating with the selected access point was successful;
   joining an existing wireless network identified in the second list by the performed scan if no identified access point remains in the first list, and otherwise operating as a gateway and permitting client devices to associate for a predetermined time and then repeat performing the scan of wireless networks.

6. The method as defined in claim 5, wherein an access point is determined to have a substandard signal quality if the access point has a received signal strength indicator (RSSI) that is less than about 8 dB above a noise floor value for the managed network.

7. The method as defined in claim 5, wherein operating as a gateway comprises:
   receiving packets of the network communication protocol over the managed network; and
   routing the packets to the wireless network with the received uplink ID.

8. A network traffic device for communication using a network communication protocol over a managed network, the network traffic device comprising:
   a network interface for communications using the network communication protocol;
   a processor that receives an uplink identifier (ID) that identifies a wireless network for uplink communication using the network communication protocol, performs a scan of wireless networks and produces identical first and second lists of access points identified by the scan and wireless networks with which the identified access points are associated, deletes access points from the first list that are not suitable for use as an uplink for the managed network, deletes access points from the second list that are not members of the managed network, associates with an identified access point that remains in the first list and operating as a gateway to neighboring access points for the uplink wireless network of the uplink ID, and joins an existing wireless network identified in the second list by the performed scan if no identified access point remains in the first list, and otherwise operate as a gateway and permit client devices to associate for a predetermined time and then repeat performing the scan of wireless networks;

wherein the processor associates with an identified access point that remains in the first list by selecting the access point in the first list with the greatest received signal strength indication (RSSI) value, sends a DHCP request message to the selected access point and associating with the selected access point with operation as a gateway, and broadcasts availability to neighbor client devices as a gateway to the wireless network with the received uplink ID if associating with the selected access point was successful.

9. The network traffic device as defined in claim 8, wherein the processor deletes access points from the first list by deleting access points from the first list that are not identified with the received uplink ID, and deleting access points from the first list that are determined to have a substandard signal quality.

10. The network traffic device as defined in claim 9, wherein an access point is determined to have a substandard signal quality if the access point has a received signal strength indicator (RSSI) that is less than about 8 dB above a noise floor value for the managed network.

11. The network traffic device as defined in claim 8, wherein the device operates as a gateway by receiving packets of the network communication protocol over the managed network, and routing the packets to the wireless network with the received uplink ID.

* * * * *